United States Patent [19]
Costanzo et al.

[11] Patent Number: 5,471,055
[45] Date of Patent: Nov. 28, 1995

[54] FOCAL PLANE ARRAY TEST FACILITY

[75] Inventors: Christopher R. Costanzo, Stafford; David R. Kaplan, Burke; Khoa V. Dang, Annandale, all of Va.

[73] Assignee: The United States of America as represented by the Secretary of the Army, Washington, D.C.

[21] Appl. No.: 68,341

[22] Filed: May 28, 1993

[51] Int. Cl.⁶ .................................................. G01D 18/00
[52] U.S. Cl. ........................................................ 250/252.1
[58] Field of Search ........................... 250/252.1 A, 332, 250/338.1, 349, 352

[56] References Cited

U.S. PATENT DOCUMENTS

| | | | |
|---|---|---|---|
| 4,709,141 | 11/1987 | Olsen | 250/332 X |
| 4,712,057 | 12/1987 | Pau | 250/311 X |
| 4,885,463 | 12/1989 | Wellman et al. | 250/252.1 |
| 4,975,573 | 12/1990 | Girard | 250/252.1 |
| 5,175,432 | 12/1992 | Reitman et al. | 250/332 |

FOREIGN PATENT DOCUMENTS

| | | | |
|---|---|---|---|
| 418509 | 3/1991 | European Pat. Off. | 250/252.1 |
| 283207 | 10/1990 | Germany | 250/252.1 |

Primary Examiner—Constantine Hannaher
Assistant Examiner—Edward J. Glick
Attorney, Agent, or Firm—Milton W. Lee; John E. Holford; Anthony T. Lane

[57] ABSTRACT

A test system for completely characterizing all known types of infrared and far-infrared detector arrays for FLIR imagers, which utilizes a number of different radiation sources, array supports, radiation filters, and radiation stops all remotely controlled and positioned by a computer which performs the test, sorts the data collected the results and presents it in a variety of formats. Also an automatic test method for characterizing infrared detectors using remote controlled radiation sources and dewar mounting devices under computer control.

8 Claims, 10 Drawing Sheets

FOCAL PLANE ARRAY TEST FACILITY

BACKGROUND OF THE INVENTION

1. Field of the Invention

The present invention generally relates to focal plane arrays of photodetectors, particularly infrared and far-infrared detectors, and more specifically to methods and means for comprehensive testing and comparing of all types of arrays for use in infrared imaging systems.

2. Description of Prior Art

In the visible light spectrum target detection and imaging systems have developed rapidly, due to their use of silicon based technology. This technology has been highly developed for all types of integrated electronic circuits. In particular charge coupled devices (CCD's) are readily married to silicon detector arrays to form highly sophisticated single chip detectors of excellent quality, that are easily mass produced.

Infrared or IR systems, which are invaluable to military and related civilian applications, have developed much more slowly. The best detectors have been photodiodes. Silicon photodiodes, however, work well only at wavelengths vary close to the visible. At lower wavelengths these diodes require compounds of elements from columns II–VI of the periodic table. At far-infrared frequencies, i.e. about 8 to 14 micron wavelengths, the best detector material appears to be mercury cadmium telluride. Such detectors vary in complexity from a single diode with elaborate scanning mirrors to a staring array using thousands, and eventually millions, of diodes. Unfortunately, these diodes require cooling to liquid nitrogen temperature to eliminate thermal noise.

Another main class of detector or imaging systems is denoted as uncooled and this class includes detectors based on ferroelectric, pyroelectric or other temperature induced changes in materials that can be manifested electronically. Such detectors may require a positive rather than a negative temperature bias, although materials that operate at room temperature are available. It thus can be seen that testing land comparing these diverse systems is rapidly becoming a major problem. In U.S. Pat. No. 4,875,004 for a "HIGH SPEED CHARACTERIZATION TECHNIQUE" by Phillip R. Boyd issued on Oct. 17, 1989; there is shown a test set which characterizes the HgCdTe array chip portion of a detector, using an E-beam generator, before the chip is mated to a silicon CCD readout to form a complete detector. An automated test set is needed that can characterize each complete detector or pixel generator, under ranges of normal operating conditions, and which interfaces a computer to store and process the data in useful statistical formats.

SUMMARY OF THE INVENTION

The test system of this invention uses the usual massive optical bench for mechanical stability. The detector, which may be termed a chip, is mounted on the bench in a temperature controlled environment. The chip is activated by computer controlled electrical signals and is exposed to controlled IR blackbody and laser sources of infrared radiation having relative motions and modulations that best exhibit the chip's performance. Output signals are sampled and stored in various formats such as video, individual detector characteristics, and overall statistical data, and as figures of merit.

It is therefore one object of the invention to provide a test facility capable of providing the above array characterizations.

It is another object of the present invention to provide such a facility with sufficient flexibility to accept the geometries and readout sequences of the various chip manufacturers.

Finally it is an object of this invention to provide a standardized procedure for evaluating and comparing the performance of all types of focal plane arrays, particularly from a military standpoint.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
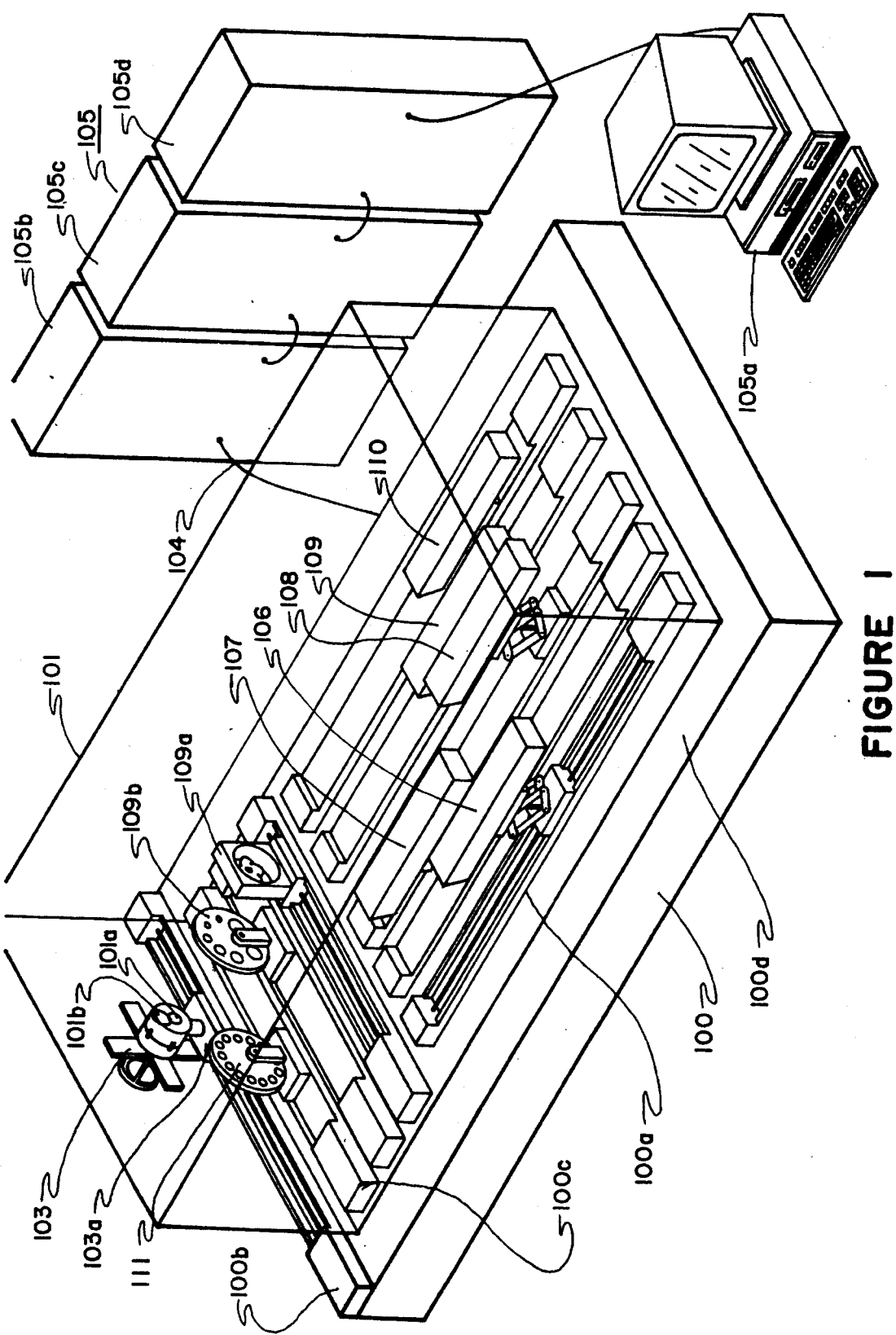
FIG. 1 shows the overall relationship of the equipment modules used in a complete test station of rectangular design.

Referring now to the drawings, and more particularly to FIG. 1, there is shown a pictorial arrangement of the equipment required in applicant's test station. For dimensional stability, various IR sources and detector arrays, as test modules, are mounted on a massive optical bench 100. The top surface of most tables exhibit a regular plane geometry, for example, it may be rectangular with a long axis of symmetry through the center of this surface parallel to a long side, called the x axis, a short axis of symmetry or y axis lying in this same surface through the same center normal to the x axis, and a z axis normal to this surface, according to conventional rectangular coordinates. A circular top surface might be best defined using cylindrical or spherical coordinates, etc., according to practices well known in the art.

The optical bench supports a dust resistant environmental housing 101 made of wood, plastic, metal or the like. The housing forms a dust cover for the IR source modules, which slide on straight tracks parallel to the x-axis like track 100A. Additional tracks like track 100B outside and track 100C inside the housing on the table parallel to the y-axis are provided adjacent to an apertured housing wall. Clear plastic housing walls one inch thick are preferred to permit observation of the relative positioning and operation of test modules. This thickness also attenuates the level of any stray radiation emitted by the laser sources to a safe level. Tables I-V give the characteristics of typical sources as exemplified by sources 106–110.

TABLE I

| Type | $CO_2$ Tuneable |
|---|---|
| Output wavelength | 9.6 to 10.6 microns |
| Power Output | 8 Watts |
| Mode Purity | TEM 00 |
| Beam Diameter | 4.5 mm $e^{-2}$ points |
| Beam Divergence | 3.5 mrad full angle. |

The housing covers only a center portion of the table, leaving an edge strip 100D of the table to support detector mounting modules. These mounting modules, e.g. a dewar module 103, communicate with the source modules through apertures in the walls of housing 101. Like aperture 101A each aperture is aligned with a track parallel to track 100A. In this design the rails of track 100B engage the bottom of a jack stand 103A

TABLE II

| Type | Helium-Neon |
|---|---|
| Output Wavelength | 3.39 um |
| Power Output | 8 mw |
| Beam Diameter | 0.7 mm |
| Beam Divergence | 1.25 mrad. |

TABLE III

| Type | Helium-Neon |
|---|---|
| Output Wavelength | 1.15 um |
| Power Output | 10 mw |
| Beam Diameter | 0.7 mm |
| Beam Divergence | 1.25 mrad. |

TABLE IV

| Type | Extended Blackbody Source |
|---|---|
| Abs. Temp. Range | +15° C. to +100° C. |
| Set Point Resolution | 0.01° C. |
| Stability | +/− 0.01° C. |
| Abs. Temp. Accuracy | +/− 0.03° C. |
| Emissivity | 0.99 |
| Source Size | 3" × 3" | supporting the dewar module 103 these rails thus guiding the stand as it moves the dewar between apertures. Inside rails like rail 100C just inside the housing may guide accessory modules such as filters and the like

TABLE V

| Type | Point Blackbody Source/Chopper |
|---|---|
| Temperature Range | +50° C. to +1000° C. |
| Control Accuracy | +/− 1° C. |
| Stability (long term) | +/− 0.25° C. |
| Stability (short term) | +/− 0.01° C. |
| Apertures | .0125, .025, .050, .100, .200, .400, .600, 1 in. |
| Warm Up Time | 90 minutes |
| Chopping Freq. | 1.2–100 khz. | between the apertures and the sources. The stand also permits fine x-y-z positioning and angular positioning when necessary.

Each of the apertures may be covered by a door 101B pivotally mounted at the top so that it will close under gravity when the aperture is not in use. The housing wall may support a resilient gasket, not shown, surrounding each aperture for an air tight seal, if the ambient temperature or pollution level is particularly hostile.

The dewar module 103 is a typical mounting environment for a far-infrared diode array. The characteristics of a typical dewar are given in Table VI. Uncooled detectors such as pyroelectric arrays can use the same module, without coolant, or a much simpler one. A cable harness 104, which includes cables for the dewar module 103 and its motorized stand, connects the modules and any environmental control devices used during a test, such as a heater or a dust filter, to a free standing computerized controller 105 placed near the table.

TABLE VI

| Type | Lakeshore MTD150 helitran low noise dewar |
|---|---|
| Optical Performance | |
| F-number | f/1.5 |
| Window | $KrS_5$, 2" |
| Optical reflections | $10e^8$ photons /cm$^2$ |
| Signal Performance | |
| Crosstalk | 0.1% at 1 Mhz |
| | (adjacent lead not grounded) |
| | 1% at 1 Mhz |
| | (adjacent lead not grounded) |
| Cooling | |
| Vacuum | $1e^{-3}$ atm inside dewar |
| | (24 hrs turbomolecular pump) |
| Cooldown rate | Cold finger 77° K in 60 min |
| | no load, $n_2$ |

This controller includes a computer, precision power supplies and precision timing pattern generators. One function of the controller is to energize the motorized stands connected to various source modules. The controller can thus rotate and/or translate the module positions relative to coordinates of the bench or table top to achieve the optimum illumination for a particular test. As an example, the effective luminance of an extended blackbody source can be varied by moving it normal to a planar array. Angular movements produce scanning of dot images, etc.. Complex variations can be produced by moving both source and detector, e.g. one in cycles the other insteps as in a raster scan.

The computerized controller consists of a number of free standing units such as a computer console 105A and cabinets 105B–105D which hold the test instruments and other equipment needed during a test. The computer may be an instrument controller such as the Hewlett-Packard HP-350 or the HP-375, equipped with large memory buffers which receive the test data elicited and processed by the computer unit. The characteristics of these computers are given in Tables VII and VIII. The racks contain calibration

TABLE VII

| Type | HP350 |
|---|---|
| Processor | MC68020 @ 25 Mhz |
| Floating Point | MC68881 @ 20 Mhz |
| Cache | 32 Kytes/0 wait states |

TABLE VII-continued

| | Type | HP350 |
|---|---|---|
| Instructions/sec | | 4 million |
| RAM | | 8 Megabytes |
| RAM access times | | 180–400 nsec |
| Bus (width) | | 32 bit address/32 bit data |
| Bus (bandwidth) | | 6 Megabytes/sec |
| Color Monitor | | 1026 × 768/8 planes | sources, precision voltage and current regulators, clock pulse generators, and switching circuits to move, adjust, and operate the sources, test arrays, and auxiliary devices on the test table. The

TABLE VIII

| Type | Hewlett-Packard Instrument Controller HP-375 |
|---|---|
| Processor | MC68030 @ 50 Mhz |
| Floating Point | MC68882 @ 50 Mhz |
| Cache | 32 Kbytes/0 wait states |
| Instructions/sec | 12 million |
| RAM | 48 Mbytes |
| Bus (width) | 64 bit address |
| Color monitor | 1024 × 768/8 Planes | clock pulse generators are precision electronic timing signal generators producing mainly square wave, harmonically related and accurately phased pulse trains, to enable individual pixel detectors. The above computers or instrument controllers support the use of the bus structures given in Table IX. The IEEE 488 bus 301 was selected as the preferred instrument and data acquisition control bus because of its simplicity, versatility, and data rate. This interface is also supported by the Rocky Mountain Basic programming language.

TABLE IX

| Type | Alternative buses for instrument controller |
|---|---|
| IEEE 802.3/Ethernet | 10 Mbit/sec |
| IEEE 488 | 350 Kbytes/sec |
| RS232C | 19,200 Bits/sec |
| GP10 | 768 Kbytes/sec |
| VME | 5 Mbytes/sec |

Relatively complex arrays may require as many as 75 leads to various support circuits in the computer-controller during a test. It is critical that these circuits do not corrupt the information elicited with excessive noise. The clock pulses are formed by a Pulse Instruments PI-5800 pattern generator and bias voltages by a PI-4000 series low noise power supplies. Characteristics of these devices are given in Table X and XI. The HP-350 has been adequate to test arrays currently in use, but to meet future requirements of staring arrays an instrument controller like the HP-375 will be required.

TABLE X

| Type | Pulse Instruments Pattern Generator PI-5800 |
|---|---|
| Output | |
| Terminated with 50 ohms, rear connectors | |
| 10 ns/20 ns pulse duration | |
| 3 ns skew between channels on the same card | |
| less than 8 ns rise time and 6 ns fall time | |
| 64 channels per mainframe | |
| Input | |

TABLE X-continued

| Type | Pulse Instruments Pattern Generator PI-5800 |
|---|---|
| External Clock TTL compatible 2.4 V, 6 ns pulse width required | |
| Trigger | |
| TTL compatible | |
| Programmable trigger TTL compatible | |
| General | |
| Internal clock frequency | 1 KHz-50 MHz |
| Resolution | 20 ns |
| Instruction memory depth | 256 lines/program to 999 total |
| Memory | 4096 bits/channel |
| CPU | Z80A |
| Programmable delay | 500 ps–31.5 ns |
| Resolution | 500 ps |

The present system supplies 26 clocks and 28 bias supplies to a test array. Parallel A/D processing is provided for every output of the array, to provide protection against signal drifts due to vibration, temperature or voltage transients. Because the noise levels are so low, the 1/f characteristic of the noise is usually masked by other sources.

TABLE XI

| Type | Pulse Instruments PI-4000 low noise Power Supply |
|---|---|
| Low noise biases | |
| Output voltage | +20.47 to –20.48 V |
| Resolution | 100 mV/10 mV/1 mV/ 0.5 mV/.025 mV |
| Accuracy | +/– 20 mV |
| Output current | +/– 25 mA max |
| Output resistance | 75 mohms |
| output noise | 250 nV/RtHz @ 1 Hz |
| | 100 nV/RtHz @ 10 Hz |
| | 30 nV/RtHz @ 1000 Hz |
| Biases per card | 4 |
| Bi-Level Clocks | |
| Output High Level | +20.47 to –20.48 V |
| Resolution | 10 mV |
| Accuracy | 100 mV |
| Output low level | –20.47 to +20.48 |
| Resolution | 10 mV |
| Accuracy | 100 mV |
| Amplitude | 1 to 25 V max |
| Transition times | 4 to 400 ns/V @ 20 V into 100 pf |
| Polarity | Inverted/Normal |
| Output resistance | 50 ohm |
| Out/put noise | 700 nV/RtHz @ 1 Hz |
| | 75 nV/RtHz @ 10 Hz |
| | 20 nV/RtHz @ 1000 Hz |
| Current sense Output | 0.1 V/mA |
| Clocks | 2 |

The computer controls motorized jack mount stands and the like through switching elements in the stands. These stands or jacks are placed under selected test modules to vary their translational, azimuthal and elevational position relative to one another and the table top. Considerable translation may be involved as when an extended backbody source is moved toward or away from a detector to vary intensity without varying the spectral quality or when one source replaces another. Smaller precise changes are required to move a dewar module to effect a pixel scan. The same is true of angular changes of a source for scanning. Since a test will always involve two modules, i.e. a source and a detector one may move quickly but imprecisely and the other slowly but with greater precision. Of course, there is an option of only one being adjustable with as little as one or two translational adjustments, but as detectors become smaller and more complex, such equipment limits will make mass testing very difficult.

The computer supplies clocked pulses via the jacks to energize the source modules as needed. The source modules located in the housing may include lasers 106 –108, as defined in Tables I–III, respectively. They may also include point source and extended blackbody sources 109 and 110, as defined in Tables IV and V, respectively. The point source includes a chopper or shutter 109A as well as an aperture wheel 109B, both electrically remote controlled by the instrument controller. These latter accessories may be built in or form separate modules which ride the inner track 100C or its equivalent 150C on a round table discussed below. They may be mounted on motorized combinations of translators, rotators, and/or elevators all coupled to the controller module by cable harness 104. The jack stands are generally adjusted to place the beam parallel to and above the table surface a minimum distance determined by the outside dimensions of the dewar or other mounting module.

Figure 1A:
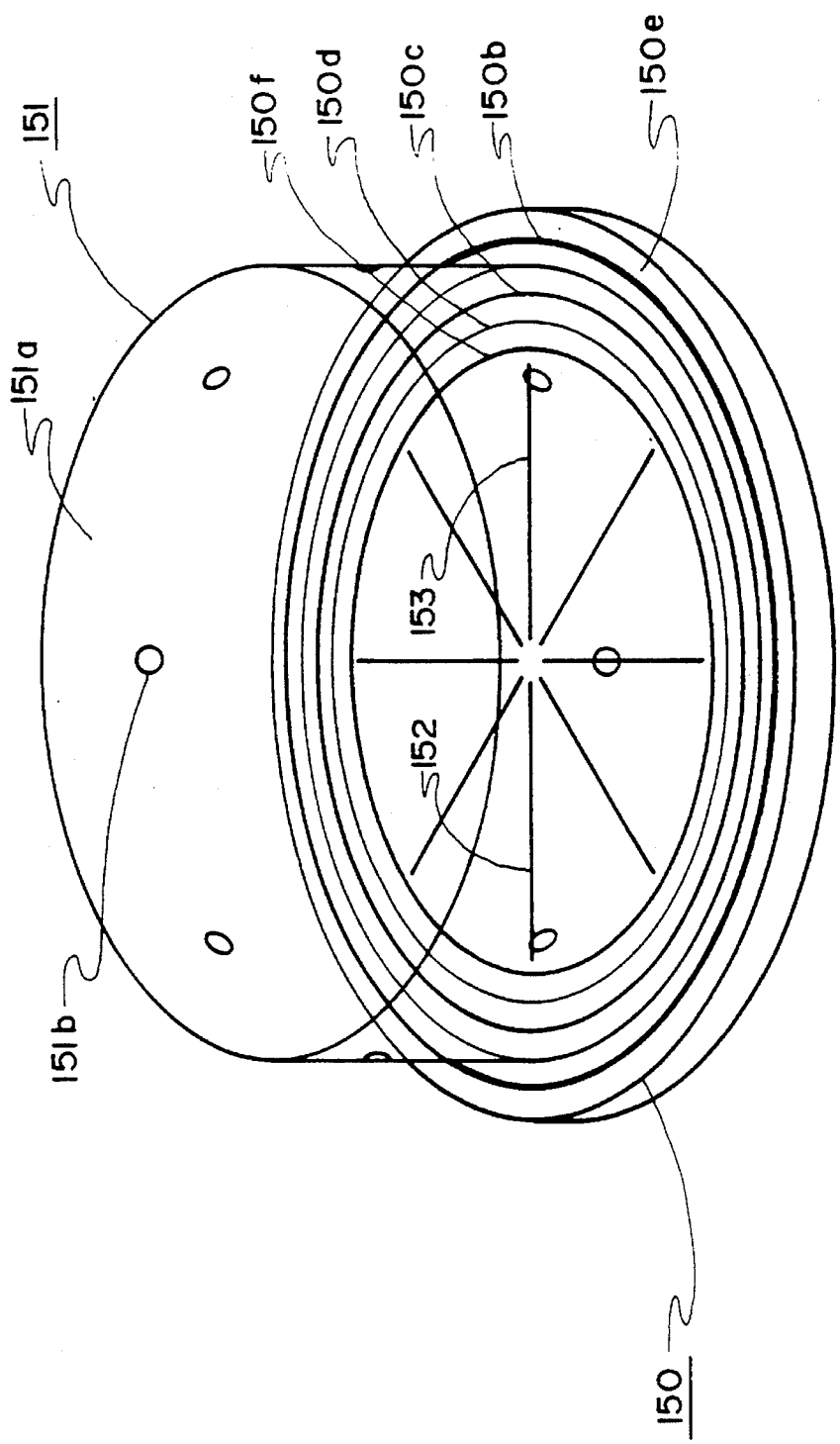
FIG. 1A shows a similar test station of circular design.

FIG. 1A shows the general configuration of a special round table design. The table 150 may have a massive center portion 150D that rotates relative to a massive annular shelf portion 150E or vice-versa. The clear housing 151 is cylindrical with a circular top 151A and has access apertures 151B, preferably equally spaced around its circumferential wall and spaced about equally from the table and housing tops. The lower edge of the apertured wall rests on the annular shelf 150E dividing it radially into substantially equal outer and inner portions. These portions each support one or more of the concentric circular tracks 150B and 150C, respectively, that provide a function, equivalent to tracks 100B and 100C. The center portion 150D may also carry one or more concentric circular tracks, like track 150F around its edge, each being similar in purpose to track 100C previously described. Pairs of collinear radial tracks 152 and 153, etc. are provided diametrically across the remaining center portion 150D of the table, each pair having its distal ends near a different pair of diametrically opposite apertures. Each pair is designed to engage the bottom of a jackstand attached to an IR source. The pairs present a short discontinuity near the center to prevent interference when a jackstand crosses the center, to compensate the stand has a mating portion large enough to firmly engage both sections of the rail at this central position. The jackstands may each carry two sources radiating in opposite directions through different ones of the pair of diametrically opposite apertures. Each pair of radial track sections is longer than the longest source and long enough to provide the maximum required change in luminosity of the extended sources, i.e. approximately 0.5–1.0 meters. The circular inside rails guide such remote controlled modules as filters, choppers or aperture stops, some of which will be discussed presently. These modules may thus remain with either the detector mounting module or a source module as the sources are exchanged by table rotation. Table rotation is not a requirement, since everything other than the sources can move circumferentially, but it does add an element of flexibility and simplicity to the system.

Referring again to FIG. 1, the sources can be augmented with a motorized rotatable filter wheel module 111. This module likewise may include a motorized jack stand to engage the Y-axis tracks inside the housing. The wheel includes a number of symmetrically arranged apertures located near its periphery that are covered with narrowband IR filters. The wheel and its stand are moved in front of various ones of the sources during a test sequence. The wheel is then rotated stepwise so that each of the apertures remains aligned with a projected image radiated from that source after response data from each detector is collected the wheel rotates to the next filter. The current wheel can carry fifteen filters substantially equally spaced across the bandwidth of the broadband source. There can also be a sixteenth aperture with no filter so that a total radiation test can be performed without translating the wheel. The wheel is driven by a sychronizeable motor coupled to the controller by means of cable harness 104 so that the response data can be correlated to each filter's wavelength. Generally the filters are in frequency sequence to generate direct frequency response curves.

The sources can also be modulated with the Mechanical Light Chopper module 109A, as previously noted in FIG. 1. This is like a motor driven fan, wherein the fan blade is shaped to provide the desired modulation function as it chops the light beam from the source. The modulation frequency can be varied by changing the motor speed. The aperture size, note the point source characteristics in Table V, can be varied by using a stepwise motorized aperture stop wheel module 109B between the chopper blade and the source. The aperture and modulation frequency may then be selected by the controller 105 through the cable harness 104. These components are usually built into the broadband source modules, but they may be independently mounted on a rail guided motorized jack on a y-axis rail and thus shared by two or more sources. Of course, both the filter and aperture stop wheel above can be used on the circular tracks of a round table.

Figure 2:
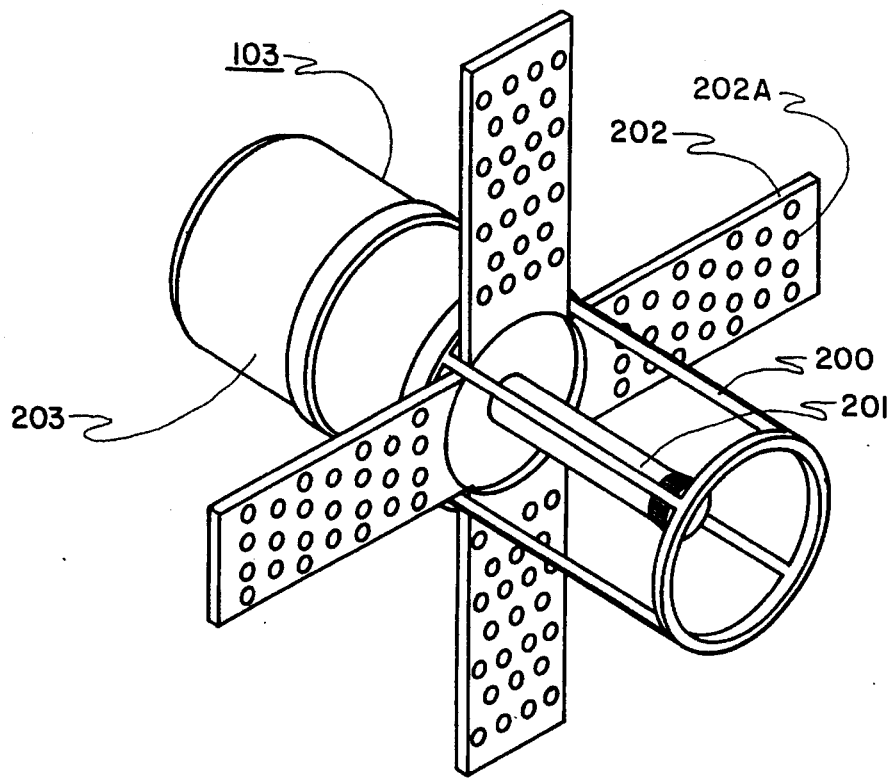
FIG. 2 shows the general structure of a dewar module, commonly used to cool infrared semiconductor detector array chips with a cruciform one hundred output terminal board added.
Figure 2A:
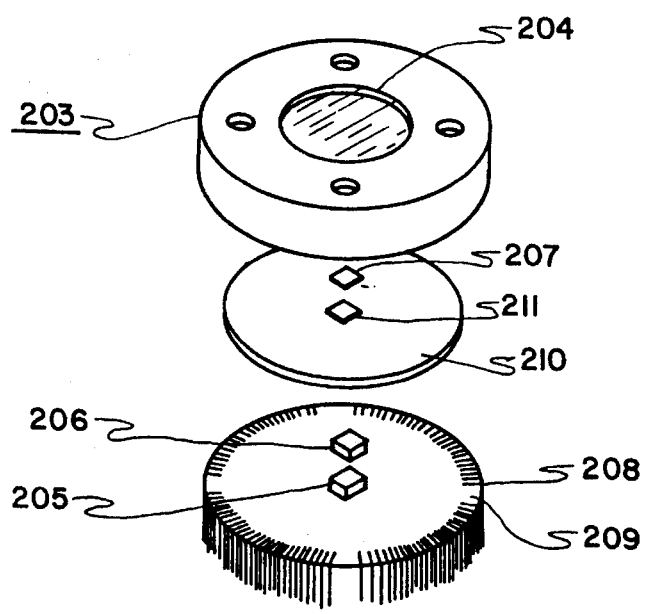
FIG. 2A shows an exploded view of the IR input end cover of the dewar of FIG. 2 and underlying detector array structure.

FIGS. 2 shows the general structure of the dewar module 103 from FIG. 1, it is a model MTD-150 in a commercially available line, sold by Lake Shore Cryotronics, inc., 64 East Walnut St., Westerville, Ohio, 43081. The dewar assembly is generally a circular cylinder, the axis of which is its optical axis. As is usual in this detector art, the dewar is a double walled vessel surrounding a cold finger, some details of which are shown in FIG. 2A. An axially aligned stand 200 is attached to the rear end of the dewar to facilitate test preparation. A filling accessory 201 also extends axially from the same end into the stand. A cruciform terminal board 202 is also attached to the rear end providing about one hundred BNC type connectors 202A, their center conductors (not shown) extending into the dewar spaced from and parallel to the cold finger and its surrounding inner wall. At the front end of the vessel is a removable cup shaped cover 203.

FIG. 2A shows an exploded view at the front end of the dewar module with the cover 203 and the array structures covered by it.

The center of the cover's endwall is apertured to receive a germanmum (Ge) or barium flouride ($BaF_2$) window 204, which is transparent to infrared and far-infrared. The end portion 205 of the cold finger is a cold pedestal that has a layer 206 of indium foil having the proper thickness covering it to create a good thermal contact between the cold pedestal and the array chip 207. Surrounding the cold finger is a radial arrangement of coaxial conductive fingers 208 that terminate the center conductors of the BNC connectors 202A mentioned above. The outer ends of the fingers are fixed on an insulating support 209, while the free inner ends terminate above the support closer to the window 204. The free ends engage an equal number of separate electrodes equally spaced around the entire circumference of a round planar element 210 called a personality board. This board carries a socket 211 designed to accept the array chip under test. The personality board also carries means for periodically sampling and temporarily storing the electrical responses of the array to radiation from a preselected light source at times prescribed by a set of computer sampling signals. It also carries all buffer amplifiers and special networks required by the chip manufacturer connected between the socket and various of the electrodes. Obviously personality cards can be made for proposed as well as existing array structures so that the test facility can be made to accept all known arrays. The personality board and detector socket are centrally apertured, so that the indium layer on the cold finger can directly contact the substrate of the array chip.

The cruciform board is metallized on one side to provide a common ground electrode for the shield electrodes of all these connectors. This common ground electrode is coupled to a corresponding element on the personality board through one of the fingers or any convenient metal part of the mounting module. Each of the four cross projections is fabricated with 25 or more BNC connectors. The cables in cable harness 104 from the test controller are terminated in plugs which mate with BNC sockets on the board.

Referring again to FIG. 1, additional dewar supports, like support 103, and dewars can be mounted on the same or a different track or at the opposite side of the housing. This is accomplished by adding additional apertures in the housing with doors or cover plates as previously described. Each will provide an alternate test capability or the ability to test two or more different arrays simultaneously. The second dewar support may be motorized to have any or all of the motion capabilities of the first support. The second support is also coupled to the controller by means of a cable 104. All such supports are supplied with control signals analogous to those of the first support, but each comes from a different port of the computer.

Figure 3:
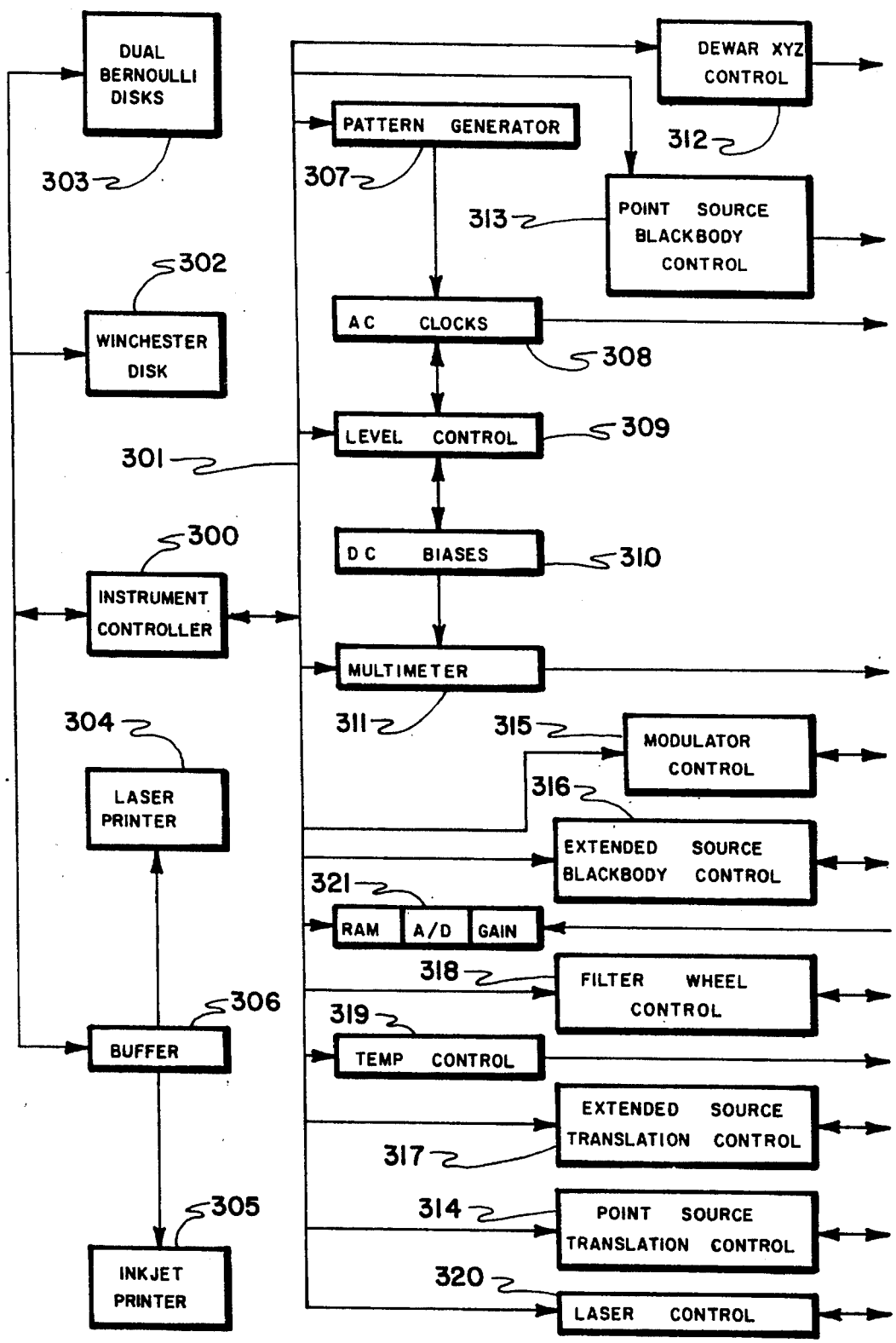
FIG. 3 is a block diagram of the computer module and associated input-output device modules.

FIG. 3 shows a block diagram of the test system. The heart of this unit is an instrument controller 300, e.g. the devices of Tables VII or VIII, which communicates with the other test controller devices through the IEEE 802.3 bus 301. The various cables from the table are connected to test controller elements as indicated. The controller stores the test programs in a conventional hard disk like the Winchester disk 302 or a floppy disk. Once a candidate array has been prepared, the appropriate test is selected from the disk menu. The computer can then perform the test, process the test data and store the results on the hard disk or other more convenient media. Storage/output devices include the hard disk 302 with forty or more Megabytes of storage capacity, a Bernoulli module 303 with interchangeable hard disks of the same or greater capacity and hard copiers such as a laser printer 304 and/or an inkjet printer 305. The latter two printer modules require a buffer 306, e.g. the device in Table XII, capable of storing 2.5 megabytes to accommodate the difference in data handling speed between the Controller and the printer.

TABLE XII

| Type | Buffer/Spooler for HP Laserjet Printer |
| --- | --- |
| Memory | 2.5 Mbytes of RAM |
| Data input rate | 20 Kbytes/sec |
| Data output rate | printer rate |

Each new focal plane array preferably will be tested with its particular associated readout circuitry on its unique personality board. This circuitry will require a certain pattern of clock pulses and bias voltages depending on the degree of noise reduction, resolution and similar properties characteristic of the image detector array. The controller signals a Pattern Generator module 307, which in turn enables a number of clocks in a Clock module 308, typically these generate harmonically related synchronized square waves. These waves then travel through separate conductors in the cable harness 104 to one of the dewar supports and some of the dewar electrodes to the personality board. The controller also energizes a Level Control module 309, which sets the amplitude of the clock pulses and energizes a DC Bias module 310 coupled through other conductors in cable harness 104 to appropriate ones of the dewar electrodes. The bias levels are displayed by a multimeter 311 wired to the DC Bias module.

Other signals supplied by the controller to bench modules through the multi-component cable 104 are:

x-y-z, azimuth & elevation positioning signals, through the Dewar Position Control module 312, to the dewar supports;

activation signals through the Point Source Activation module 313 to the Point Source Blackbody;

translation signals through the Point Source Translation Module 314 to the Remote Control Translator under the Point Source Blackbody;

activation signals to the Modulation Control module 315 which varies the aperture and frequency of the Mechanical Light Chopper;

activation signals through the Extended Blackbody Source Activation module 316 to the Extended Blackbody Source;

translation signals through the Extended Source Translation module 317 to the Remote Control Translator under the Extended Blackbody Source;

wheel angle position signals through the Filter Wheel Control module 318 to the Filter Wheel;

temperature signals through the Temperature Control module 319 to an electrical heater in the dewars to permit testing at temperatures above the boiling point of the cooling agent;

laser activation and scanning pulses through the Laser Control Module 320; and data input signals to the Input Data Conversion module 321.

Figure 4:
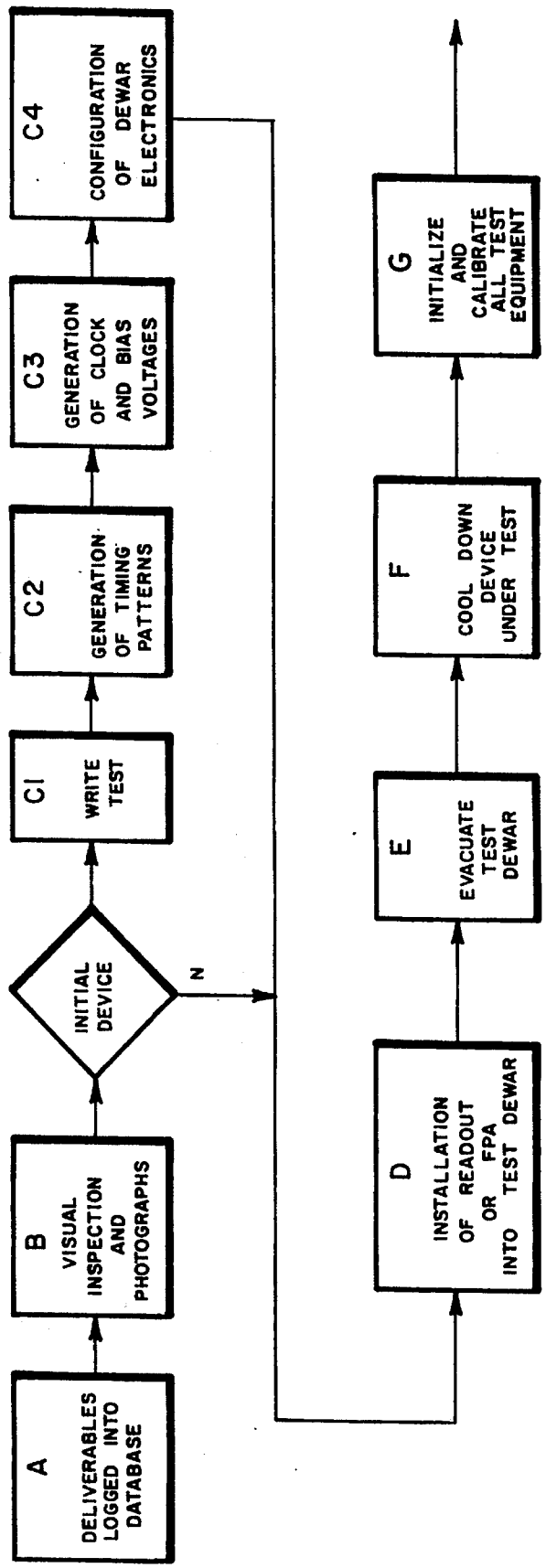
FIG. 4 shows a Flow Chart of the preparation procedure for a typical test.

In FIG. 4 there is shown a flow chart of the current pretest preparation procedure as applied to a new focal plane IR detector. In an ideal situation the manufacturer supplies random samples of newly produced test items which include a readout circuit such as a silicon CCD, a focal plane array such as a two dimensional diode detector pattern on a HgCdTe chip, and a hybrid circuit combining the first two items. Evaluation of such test items includes the following steps:

A. Logging in the test items as they are received by name and/or identification number with any available design or previous test data available;

B. Inspecting each test item microscopically to detect any obvious flaws, to study the architecture of the circuit and to determine the suitability of existing test hardware for its evaluation, this involves the following substeps, B1. Examining the item under a microscope to locate obvious structural faults due to processing or handling, and B2. Microphotographing useful test items to later investigate subtle flaws that show up under test or to identify defects caused by subsequent testing.

The next step depends on whether this is the first test of the item using applicant's apparatus and method. If the forgoing is true, then the following steps are performed:

C. Altering the test hardware and software to conform to any unforeseen physical or electrical attributes of the item, which involves the following substeps:

C1. Selecting a test program, or Writing a new program to cover the specific characteristics of the new item, C2. Fabricating new timing circuit boards, as required, for the pattern generator, C3. Fabricating new voltage regulation boards for the level control circuit of the computer-controller, if necessary, C4. Fabricating a personality board for the new item, preferably using support items as used by the manufacturer, such as a socket for the array, buffer amplifiers, filters and the like, bypassing substeps C1–C4 can save as much as a week.

The method continues with the following:

D. Installing the test item is accomplished by the following substeps:

D1. Plugging the test item into its personality board,

D2. Snapping the latter into the spring fingers on the cold finger, and

D3. Assembling the finger with the remaining parts of the detector dewar module;

E. Removing air from the space between the double walls of the dewar module using a vacuum pump;

F. Flooding the module reservoir with a liquified gas coolant such as nitrogen or helium;

G. Initiallizing and calibrating the test equipment using a software program to automatically perform the following substeps, G1. Setting the initial location of the dewar module relative to each source used, G2. Setting the initial biases, clock frequencies, clock phasings, as prescribed by the manufacturer, and G3. Electrically heating the module to the prescribed operating temperature.

Figure 5:
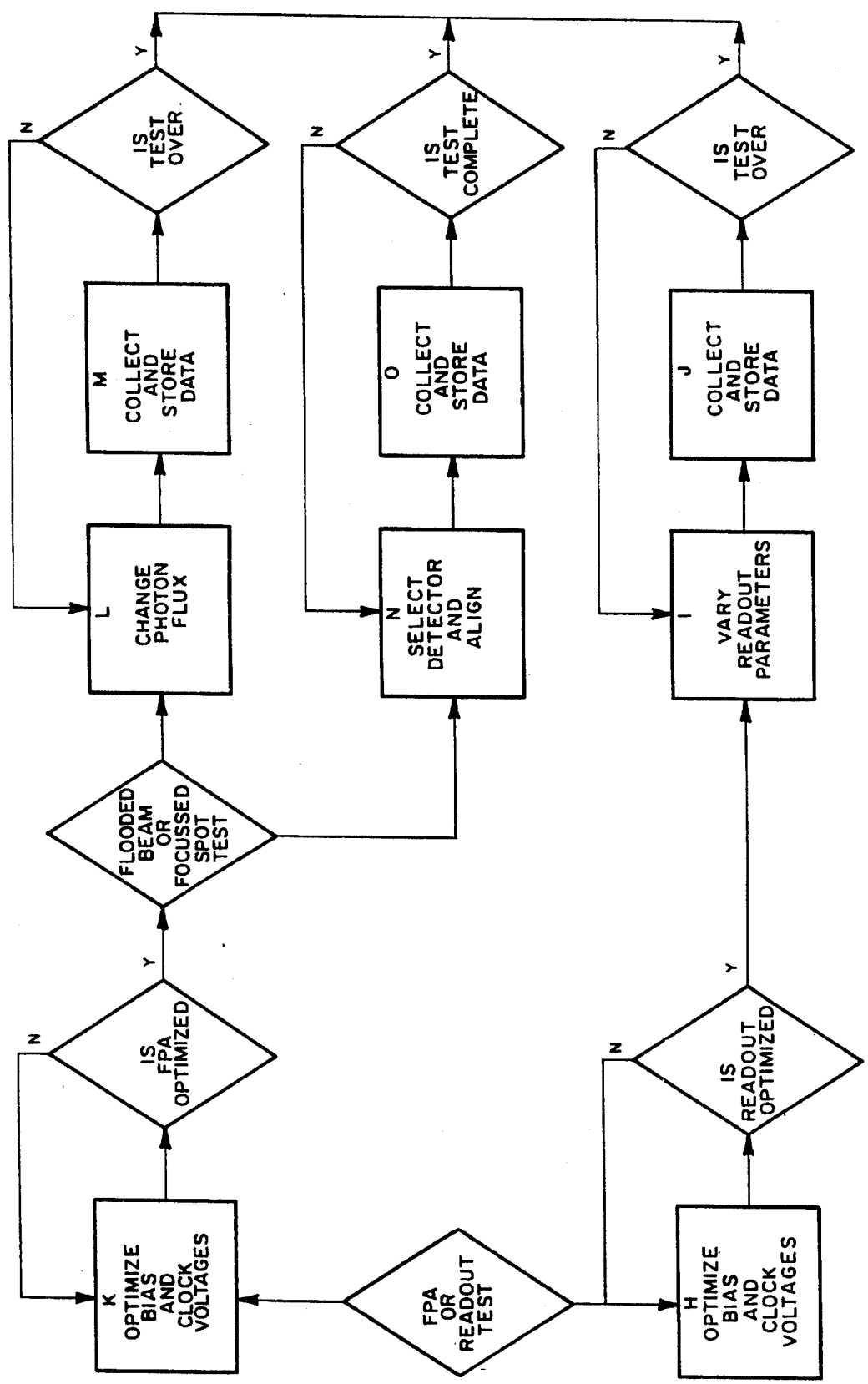
FIG. 5 shows a Flow Chart of typical test procedures.

FIG. 5 shows a flow chart of the procedures for testing the three types of test items mentioned above, if the item is a readout circuit, typically a CCD, the manufacturer supplies a circuit with a special large input electrode: connected to one or more of the microscopic charge injection points. The test then involves the following steps:

H. The applied bias and clock voltages are optimized by performing the following substeps;

H1. Setting bias voltages to the circuit by entering a series of initial test values for these voltages which are about 20% below the manufacturers design value, and entering a similar correllated series of optimal voltage values equal to zero, H2. Applying clock signals at recommended frequencies, H3. Applying a fixed sine wave voltage to the special electrode, H4 Setting a next previous sample to zero, H5. Applying all of the bias voltages to their respective electrodes in the circuit, regardless of their position in the series, H6. Sampling the resulting signal to noise ratio at the circuit output to get a response sample, H7 Calculating the difference between the test response sample and the next previous sample, H8. If the sign of the difference is negative, storing the next previous sample as an optimal value of the first voltage in the series and going to step H10, H9. Changing the next previous sample to the value of the first voltage, incrementing the first voltage by a small percentage of its value and going to step H5, H10. Advancing each voltage in the series by making the first voltage the last, H11. If the optimal value of the first voltage is zero go to step H4

I. Setting all of the above voltages to their optimal values,

J. Generate and store test data by applying various frequencies and amplitudes to the special electrode.

If the test item is only a focal plane detector the manufacturer supplies one or more special electrodes as with the readout device above. Hybrid detector-readout devices can be tested as originally manufactured. Either test involves the following steps:

K. Optimizing the bias voltages and clock voltages in the substantially the same manner described in steps H1–H7.

L. Testing the arrray for overall sensitivity to flux magnitude and flux frequency by means of the following steps:

L1. Separating the array from an extended blackbody source until a minimum response is obtained; and L2 Moving the source steadily toward the array until a maximum response is obtained or the image of an aperture, such as the aperture of the filter wheel just fills the array, M. Data is collected and stored by the following steps:

M1 Sampling the array response at regular time intervals; and

M2. Storing The sample responses in digital form;

M3. Repeating steps L1–M2 with each filter in the filter wheel;

M4. (Optional) Repeating steps L1–M2 or M3 or both with the chopper set at different frequencies;

M5 (Optional) Repeating steps L1–M2, M3, M4 or any combination of these steps with the array temperature set at various levels above and below the value recommended by the manufacturer.

N. The second type of test usually desired on hybrid detector-readout is a focussed spot test using the following steps:

N1. Illuminating the array with a spot source such as the blackbody spot source or a laser;

N2. Focussing the spot either to the size of a detector or a small fraction thereof;

N3. scanning the spot over the array by moving the mounting module and/or the source normal to the beam, to produce a raster scan of the surfaces of every detector element.

O. Recording the array response by the steps of:

O1. Sampling the response of the array at regular intervals directly proportional to the size of the spot relative to the size of the detector element to obtain at least one sample per element minimum;

O2. Storing said samples in digital form for simple arrays and in video signal form for a hybrid array and readout device;

O3. (Optional) If a blackbody spot source is used, repeat steps N1–O2 with the open aperture and each filtered aperture in the filter wheel rotated into the beam path;

O4. (Optional) If a blackbody spot source is used, repeat steps N1–O3 with each filter in the chopper set at various frequencies;

O5. (Optional) Repeating steps N1–O2, O3, O4 or any combination of these steps with the array temperature set at various levels above and below the value recommended by the manufacturer.

Figure 6:
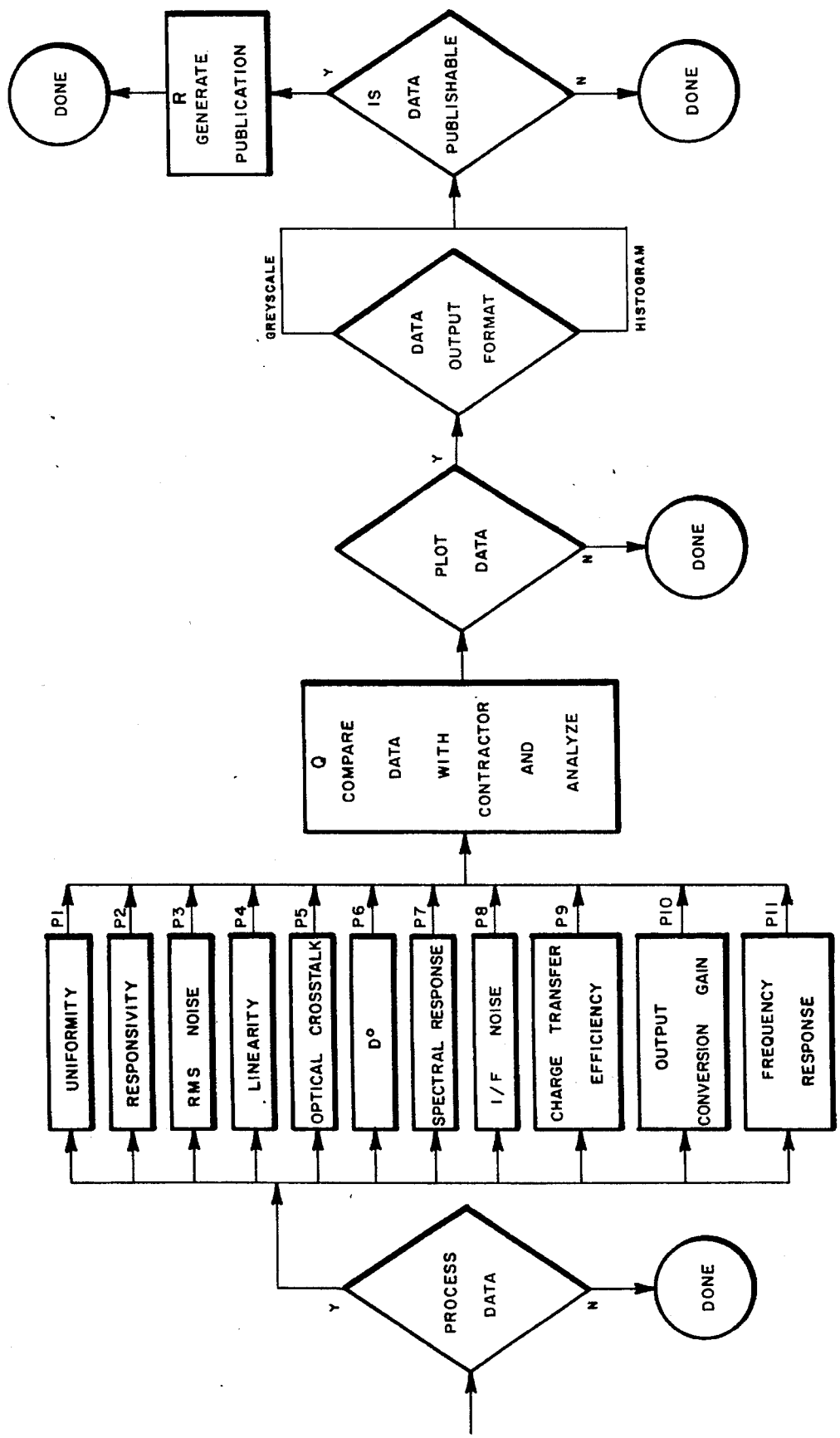
FIG. 6 shows a Flow Chart of typical data processing steps that utilize the data collected in the test procedures above.

FIG. 6 shows a flow chart of the method for processing the stored data in a computer. The latter can be programmed in basic to utilize the various algorithms for P1-uniformity, P2-responsivity or any other of the eleven system parameters P1–P11 shown. Thus the final steps in the test program comprise the steps:

P. Reducing the response data generated in each test into standard operating parameters;

Q. Formatting the parameters into histograms, grey scales and the like for quick display; and R. Publishing parameters in the form of charts, graphs, tables and the like.

Figure 7:
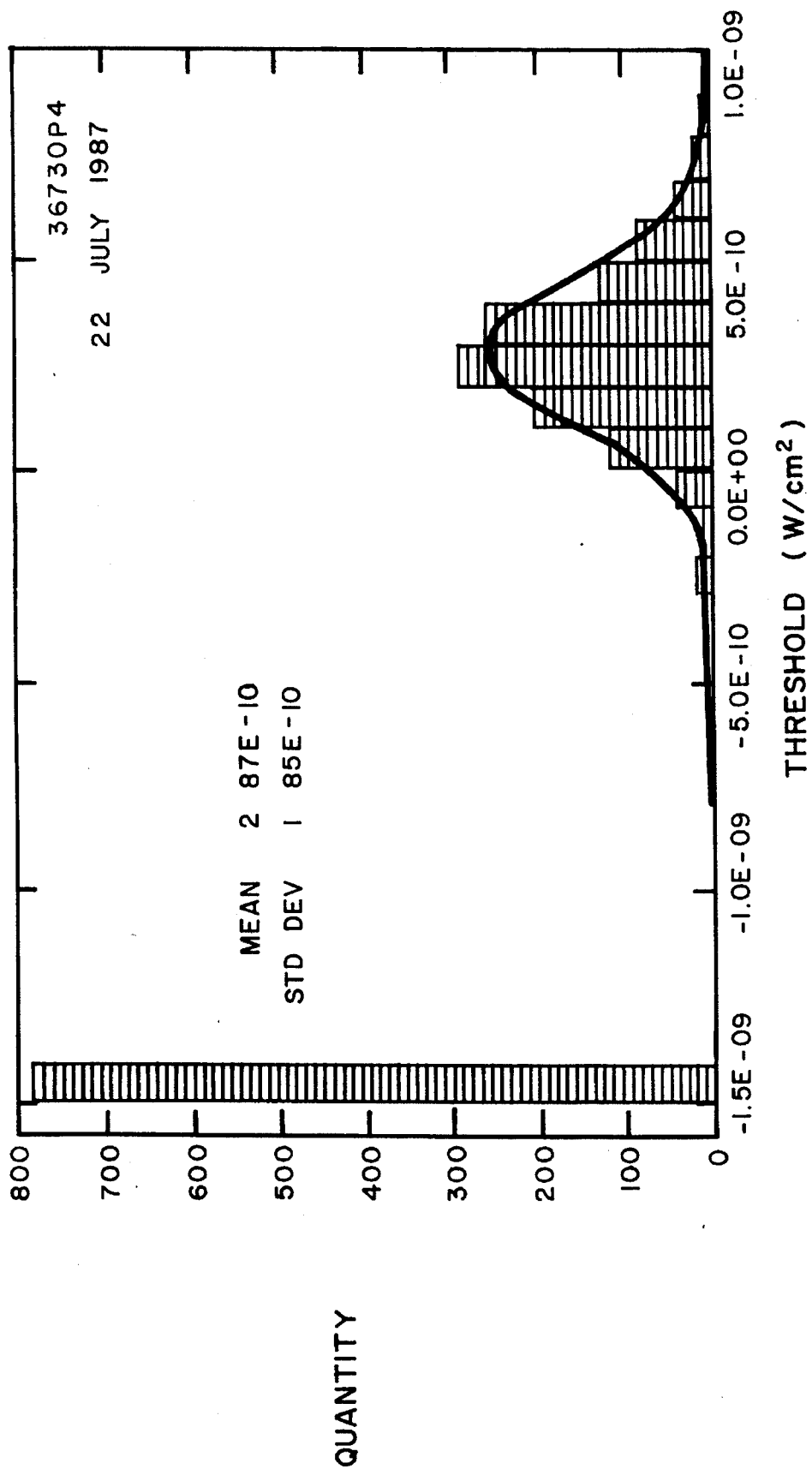
FIG. 7 shows a histogram used to display statistical data relating pixel elements of one or more arrays.

As shown in FIG. 7, when publishing or otherwise disseminating the collected test data, it can be displayed using histograms that tabulate certain statistics including the mean and standard deviation over the entire focal plane array. These statistics are computed using a Guassian curve fitting technique, which is suitable for conveying scanning and linear focal plane array results. A more complicated approach is used to display staring array data. This two dimensional data can be displayed using standard grey scale mapping techniques. This form of display will not only produce the mean and standard deviation across the staring focal plane array, but will give a graphical two-dimensional view of how the parameter in question changes with physical location across the array. A description of these techniques can be found in the SPIE Proceedings, Vol. 1308, published Apr. 20, 1990 pp. 197-8.

Figure 8A:
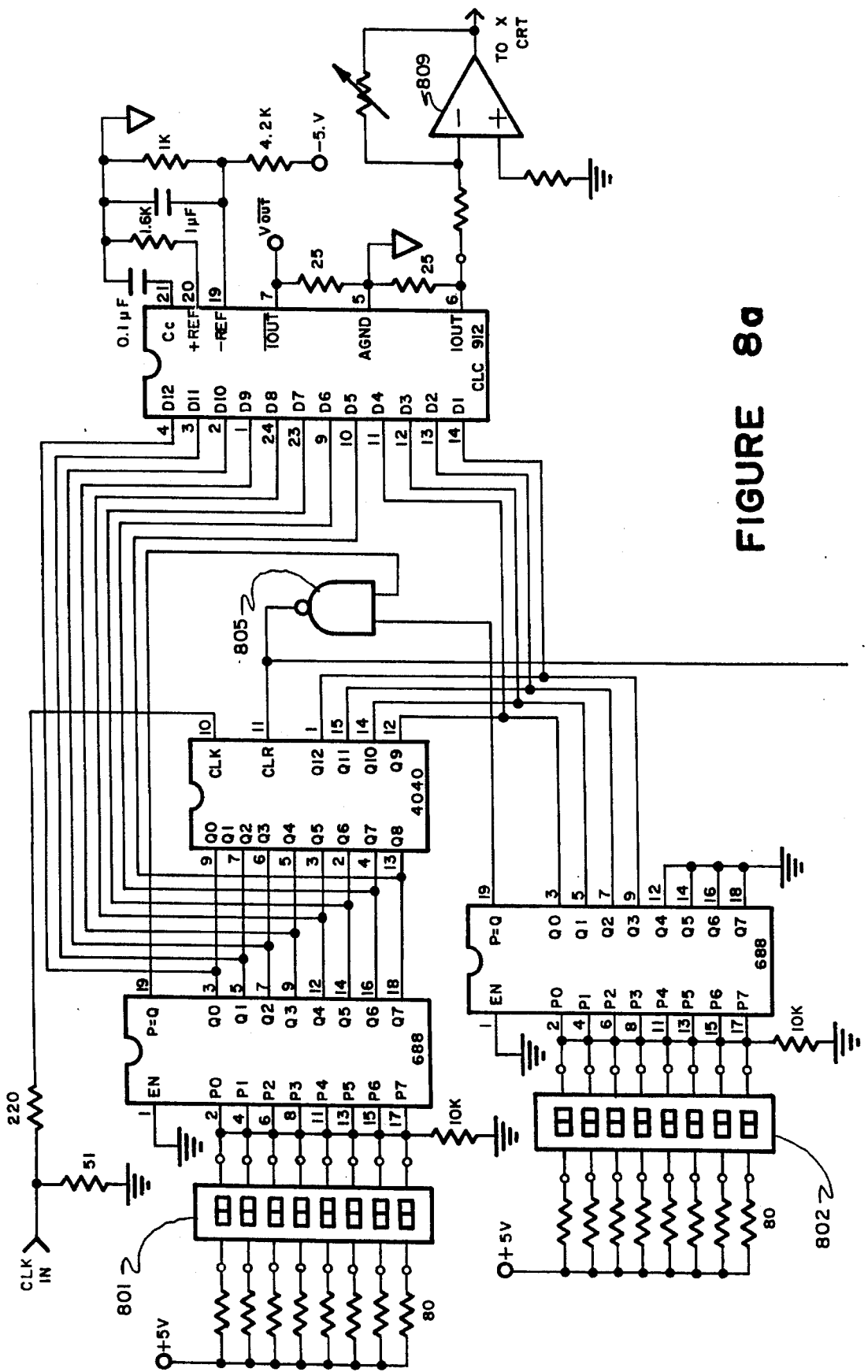
FIGS. 8a and 8b show a special timing circuit for the pattern generator module, which has been developed to generate raster test scans of a staring array.
Figure 8B:
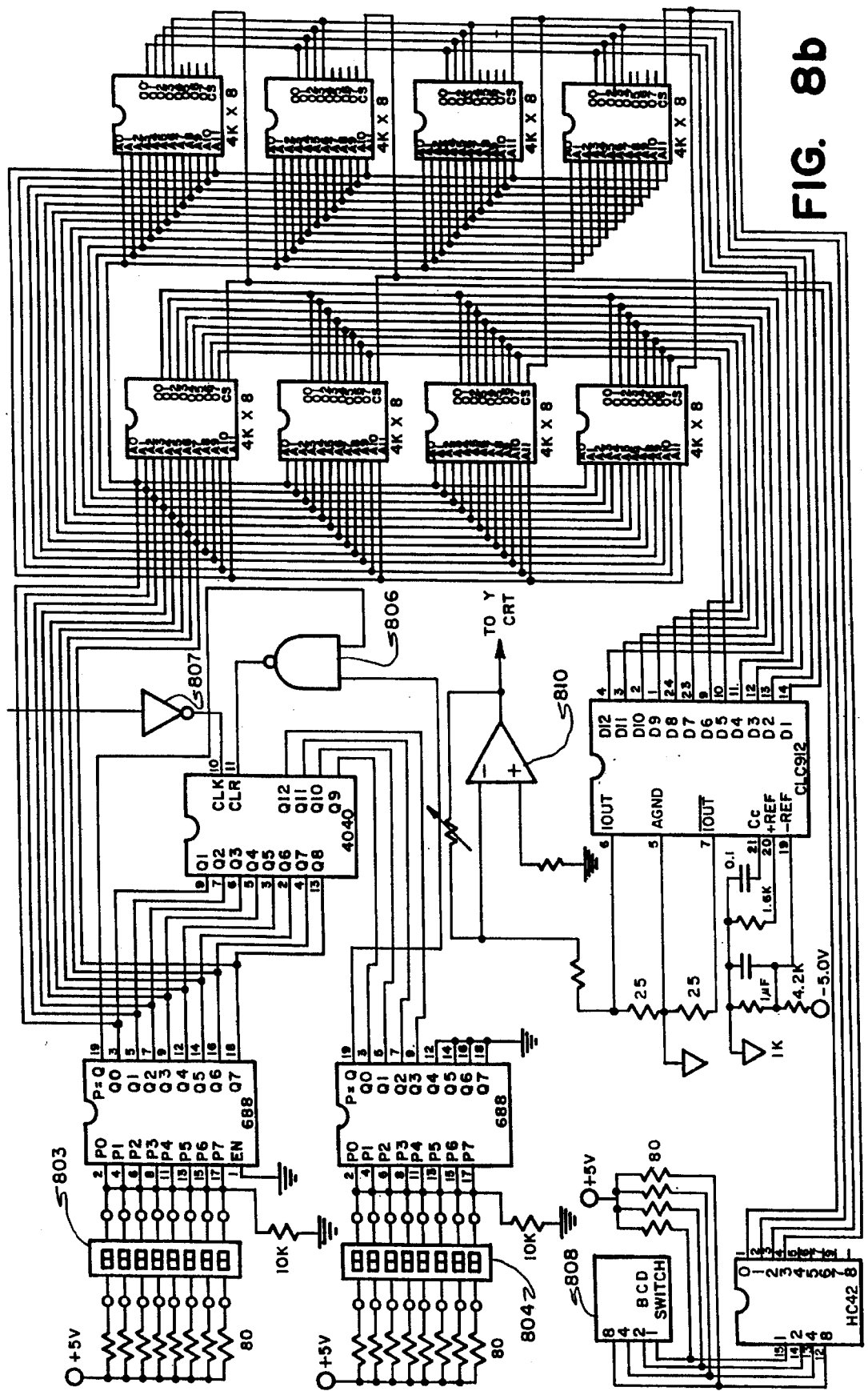

FIGS. 8A and 8B show one form of a timing circuit board for use in the test controller. It uses a number of well known integrated circuits and other circuit elements defined in the drawing. The manner of their interconnection is also shown. The circuits marked 688 are HC688 identity comparators. HC4040 is similarly a twelve stage binary counter. HC42 is a binary to decimal decoder. CLC912 is a digital to analog converter. The 4K×8 elements are read only memories (ROM's) in which are stored interlacing schemes. This circuit provides the timing for an arbitrary x,y raster. Standard timing pulses from a precision oscillator are applied at the input specified "CLK IN" at the top left of the drawing to the input of the "x" HC4040 counter. Setting dip switches 801 and 802 specifies value of x or the horizontal steps (pixels) along a raster line switches 803 and 804 are used, respectively, to set the value of y or the number of lines in the raster. NAND gates 805 and 806 combine the two x and the two y settings, respectively, to reset the HC4040 counters. The NOT gate 807 converts the clear pulse for the x counter into a clock pulse for the y counter. The BCD switch 808 is used to select from up to four different interlace schemes from the horizontal pairs of ROM's. The analog x and y signals, that are used to control the CRT display and other events that occur during a test, appear at the output of operational amplifiers 809 and 810, respectively.

While this invention has been described in terms of preferred embodiment consisting of specific tables, sources, array fixtures, and computer-controller hardware; those skilled in the art will recognize that the invention can be practiced with modification within the spirit and scope of the appended claims:

Having thus described my invention, what I claim as new and desire to secure by Letters Patent is as follows:

1. An automated test station for infrared focal plane detector arrays comprising:

a stable optical bench platform;

a housing member mounted on said platform covering a central portion only of the top of said platform, the remaining edge portion of said top forming an outer support shelf for detector mounting modules;

at least a first aperture in said housing having a door the top of which is pivotally attached to said housing to close said aperture automatically when not in use;

a plurality of infrared source modules in said housing, each including a source to project a different infrared image along a first optical axis through said aperture in response to a set of computer test source signals;

at least one detector mounting module positioned on said support shelf whereby each said detector mounting module forms a test pair with each source module, each said detector mounting module further including, a planar end transparent to far infrared adjacent said housing member and normal to said first optical axis;

a first socket means mounted in said detector mounting module electrically interfacing and supporting a planar personality circuit board parallel to said planar end;

said personality circuit board including, a plurality of electrodes, a second socket means electrically bonded to said plurality of electrodes to mate with a focal plane infrared detector array to be tested, said second socket means and said array being oriented parallel to said planar end, and means for periodically sampling and temporarily storing the electrical responses of said array to infrared light from said sources in response to a set of computer sampling signals;

a terminal board carrying a plurality of coaxial connectors mounted on said detector mounting module opposite said planar end, more than half of said connectors being electrically coupled to said first socket means;

a temperature control means located in said detector mounting module to maintain the temperature therein constant at a temperature within the operating temperature range of said array;

remote controlled positioning and angular orientation means mounted on said platform and supporting at least one module of a pair including one source module and one detector mounting module for changing the relative position and orientation between various parts of said pair in response to a set of computer positioning signals;

a memory means for permanently storing data related to said electrical responses sampled by said personality circuit board in response to a set of computer storing signals;

a monitor means to display said data in response to a set of computer displaying signals; and a computer-controller means electrically intercoupled with said personality circuit board, said sources, said memory means, said monitor means and said positioning and angular orientation means for generating sets of precise bias voltages and clocked signals which constitute said test source, positioning, sampling, displaying and storing signals and for processing said data to determine the operating characteristics of said array.

2. A test station according to claim 1, wherein:

said positioning and angular orientation means linearly varies the relative distance between at least one of said sources and said array with time.

3. A test station according to claim 1, wherein:

said positioning and angular orientation means varies the relative angular position between at least one of said sources and said array with time.

4. A test station according to claim 1 wherein:

said sources include lasers operating in different frequency ranges.

5. A test station according to claim 1 wherein:

said sources include black body radiators generating broad frequency band images from point size to sizes greater than the size of an individual detector in said array.

6. A test station according to claim 1 wherein:

said sources project images at said detector that vary in size from a fraction of the area of a pixel to more than the area of the image processed by the array.

7. A test station according to claim 1 wherein:

at least one of said souces is an extended blackbody type projecting an image larger than said array can process and having a remote controlled rotateable aperture plate with a variety of different apertures that vary the size of the image.

8. A test station according to claim 1 wherein:

at least one of said sources is a blackbody type source including a remote controlled rotatable aperture plate with a series of equal size apertures substantially equally spaced around the periphery of said aperture plates, said aperture plate being rotatable mounted in front of said backbody type source so that each aperture passes the same desired solid angle of radiation;

each aperture being covered by a filter having a narrow pass-band different from any other aperture, the total range of all said filters being substantially equal to the frequency range of said array; and said aperture plate being mechanically coupled to a remotely controlled motor coupled electrically to said computer-controller means to rotate said aperture plate stepwise the distance between said apertures in response to said test source signals.

\* \* \* \* \*